United States Patent [19]

Montgomery et al.

[11] Patent Number: 5,696,533
[45] Date of Patent: *Dec. 9, 1997

[54] METHOD FOR SELECTING AN ITEM ON A GRAPHICS SCREEN

[75] Inventors: Kent M. Montgomery; Bruce E. Blaho, both of Fort Collins, Colo.

[73] Assignee: Hewlett-Packard Company, Palo Alto, Calif.

[*] Notice: The term of this patent shall not extend beyond the expiration date of Pat. No. 5,555,003.

[21] Appl. No.: 616,017

[22] Filed: Mar. 14, 1996

Related U.S. Application Data

[62] Division of Ser. No. 417,183, Apr. 5, 1995, Pat. No. 5,555,003.

[51] Int. Cl.⁶ .................................................. G09G 5/08
[52] U.S. Cl. ................................... 345/146; 345/203
[58] Field of Search ............................. 345/133, 145, 345/146, 156, 157, 158, 185, 189, 200, 902, 903; 395/352

[56] References Cited

U.S. PATENT DOCUMENTS

| 4,116,444 | 9/1978 | Mayer et al. |  |
| 4,754,267 | 6/1988 | Reynolds et al. | 345/145 |
| 4,896,291 | 1/1990 | Gest et al. | 345/146 |
| 5,555,003 | 9/1996 | Montgomery et al. | 345/146 |

*Primary Examiner*—Regina D. Liang

[57] ABSTRACT

An item buffer is used to determine which graphic object has been picked by a user. A graphics object list is traversed to display each graphic object and assign a unique item identifier to each. For each pixel location in each of the graphic objects, the unique item identifier is stored at a corresponding location in the item buffer. A graphics object is selected using a pointer device, and the pointer device location is used to access the item buffer and retrieve the item identifier that defines the graphic object picked. If a pixel location in the item buffer is not large enough to hold the complete item identifier, the item identifier is partially constructed in each of several passes, and the pass data combined in main memory.

4 Claims, 10 Drawing Sheets

METHOD FOR SELECTING AN ITEM ON A GRAPHICS SCREEN

CROSS REFERENCE TO RELATED APPLICATION

This is a divisional of application Ser. No. 08/417,183 filed on Apr. 5, 1995, now U.S. Pat. No. 5,555,003.

FIELD OF THE INVENTION

This invention relates to computer systems and more particularly to graphics display devices within such computer systems. Even more particularly, the invention relates to selecting a graphic object on a display screen.

BACKGROUND OF THE INVENTION

Graphic images displayed on computer screens are most often stored in the memory of the computer as a list of graphics objects. This list includes the color of the graphics object, the location for displaying the graphics object on the screen, and other information. When displaying the graphic image, this list is processed, called traversing, and each graphics object is selected from the list and displayed, or rendered, on the graphic screen at the location defined in the list. Thus, the entire graphic image exists only on the screen. When a new graphics object, for example a line, is placed in the image on the screen, a new list element is created for the line indicating the starting and end points of the line, and a new screen image is displayed from the list.

One of the operations that is commonly done by a user to a graphics image is to select one of the graphics objects and perform some operation on the selected graphics object. For example, the color of the selected graphics object could be changed, the graphics object could be deleted, etc. To the user of the system, a graphics object is selected by using a pointer device, such as a mouse, moving the screen pointer to the graphics object by moving the pointer device, and selecting the graphics object by clicking the pointer device button. The graphics object is then highlighted on the screen, either by intensifying the graphics object or changing the color of the graphics object, to indicate to the user which graphics object has been selected. After the selection, the user then performs the operation on the graphics object using either the mouse or the keyboard as input.

To perform the selection, or picking, operation, prior art systems traverse the entire list of graphics objects whenever the selection button on the mouse is pressed. As each graphics object is rendered during this traversal, i.e. the graphics object is constructed to be placed on the screen, the location of the pointer on the screen is compared to the location of each pixel of the graphics object, and if a match occurs, the graphics object is considered to be selected. This method is slow, however, since every graphics object up to the selected graphics object must be rendered even though only the last one is being selected. Thus, prior art methods have a performance proportional to the number of graphics objects in the display list and their performance is roughly equal to the time to display the entire graphics image or scene.

The IBM model 5080 system continually refreshes the screen from the display list, thus this system can pick during the refresh cycle using special hardware. When displaying large numbers of graphics primitives, however, flicker occurs in this system.

One prior art solution for this problem is discussed in *Computer Graphics Principles and Practice*, by Foley et al., Addison Wesley, 1990, pp. 48–50. This method divides the screen area into regions so that only the graphics objects contained within the region need be rendered in order to determine whether one of the graphics objects has been picked.

The concept of item buffers and picking is disclosed in "Direct WYSIWYG Painting and Texturing on 3D Shapes", Hanrahan, et al., *Computer Graphics*, Volume 24, number 4, August 1990, p. 218. This article discloses the general concept of item buffers, but provides no detail on how to implement an item buffer.

There is a need in the art then to improve performance in the method of picking a graphics object on a graphics screen. There is a further need to pick the graphics object without having to traverse the entire graphics objects list. The present invention meets these and other needs.

SUMMARY OF THE INVENTION

It is an aspect of the present invention to provide a method of selecting, or picking, a graphic object being displayed on a display screen.

It is another aspect of the invention to use an item buffer for selecting the graphics object.

Another aspect is to assign each graphic object an item identifier and store the item identifier in the item buffer at a location corresponding to the location of the graphic object on the display screen.

The above and other aspects of the invention are accomplished in a system which uses an item buffer to determine which graphics object has been picked by a user. When a pick operation is started, the method traverses the graphics object list rendering each graphics object and assigning an item identifier, typically a number, to each graphics object. At each pixel location rendered for each of the graphics objects, the method stores the item identifier of the graphics object at a corresponding location in an item buffer, since each location of the item buffer is large enough to hold the item identifier. Thus, for each pixel of the graphics image that is displayed on the graphics screen, there is a corresponding pixel location in the item buffer that contains the item identifier of the graphics object displayed at the pixel location. When the user selects a graphics object using a pointer device button, the location of the cursor on the screen, or a location very near the cursor location, is used to reference the item buffer and retrieve the item identifier at the item buffer location corresponding to the cursor location at the time the button was pushed. Since the item identifier corresponds directly to one of the graphics objects in the list, the item picked can be determined directly from the item buffer.

The item buffer may be constructed in one of several different ways. If the graphics device in the system contains alternate display buffers, one of the display buffers that is not currently being used as the frame buffer to display the graphic image can be used to create the item buffer. Alternatively, the item buffer may be created in the main memory of the computer containing the graphics system.

Each location in the item buffer, which represents a pixel in the graphics image, must be able to store an identifier large enough to represent all of the graphics objects in the list. Thus, if the list contains less than 256 graphics objects, each location of the item buffer need only be eight bits wide. However, most graphic images contain more than 256 graphic graphics objects, therefore a much wider item buffer location is needed. If each element of the item buffer is not wide enough to hold a complete item identifier, the list may be constructed piecewise where part of the identifier is stored on one pass of rendering the image, then the item buffer is copied to main memory, and the rest of the item identifier is stored on second or subsequent passes. The results of all the passes are combined in main memory to create an item buffer.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
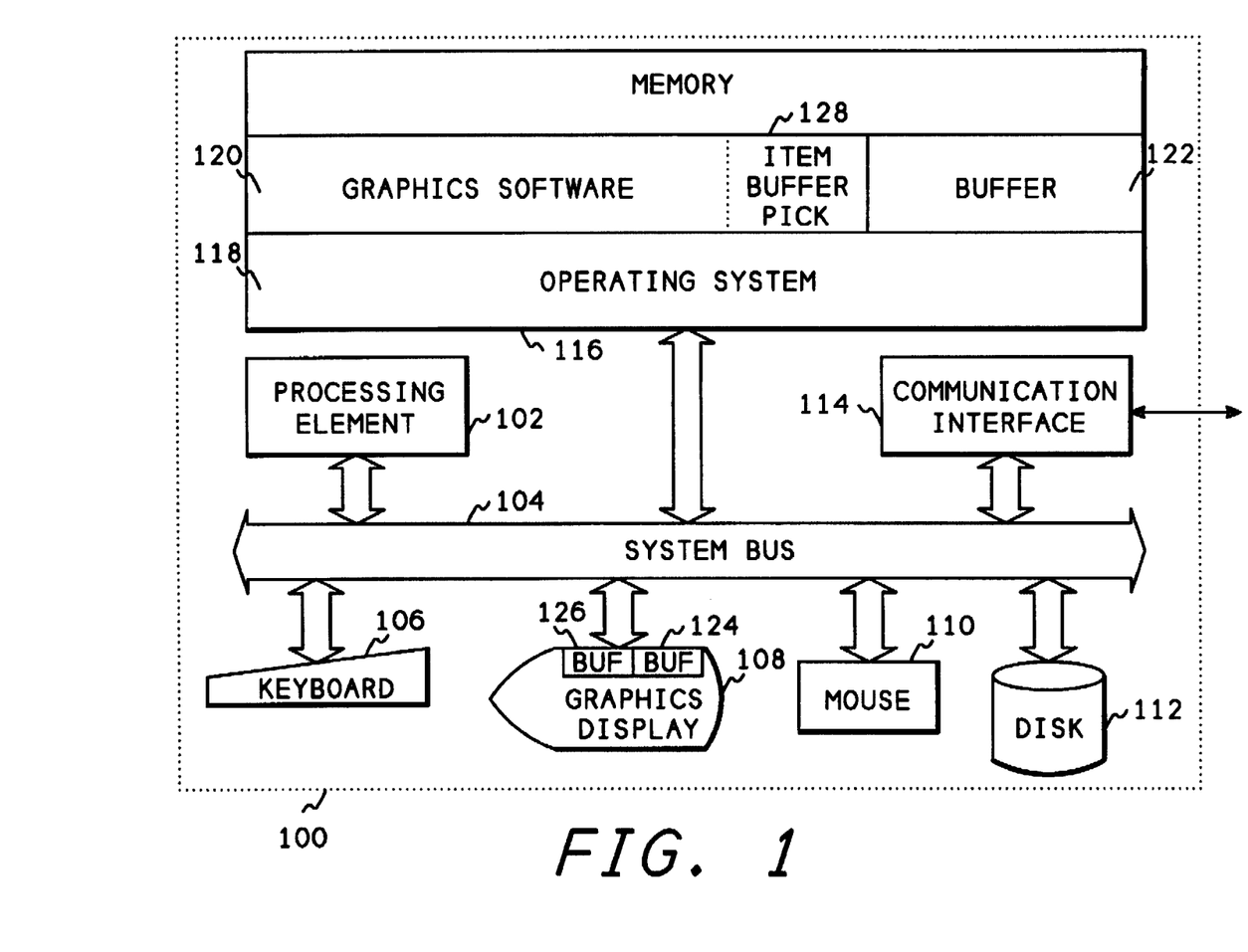
FIG. 1 shows a block diagram of the hardware of the invention.

FIG. 1 shows a block diagram of the hardware and software of the invention. Referring now to FIG. 1, a computer system 100 contains a processing element 102 which communicates to other elements of the computer system 100 over a system bus 104. A keyboard 106 allows a user of the system 100 to input commands and data into the computer system 100, and a mouse 110, or other devices such as trackball, tablet and stylus, etc., allows the user to input graphical information into the computer system 100. A display 108 allows the computer system 100 to output information to the user of the system. A disk 112 stores the software of the present invention as well as the graphics images displayed by the present invention.

The graphics display 108 may contain one or more buffers 124 and 126 which can serve as a frame buffer to display graphics or used as an item buffer to store item identifiers. Item identifiers are typically numbers. Alternatively an item buffer 122, constructed in main memory 116, can be used to store the item identifiers.

Figure 2:
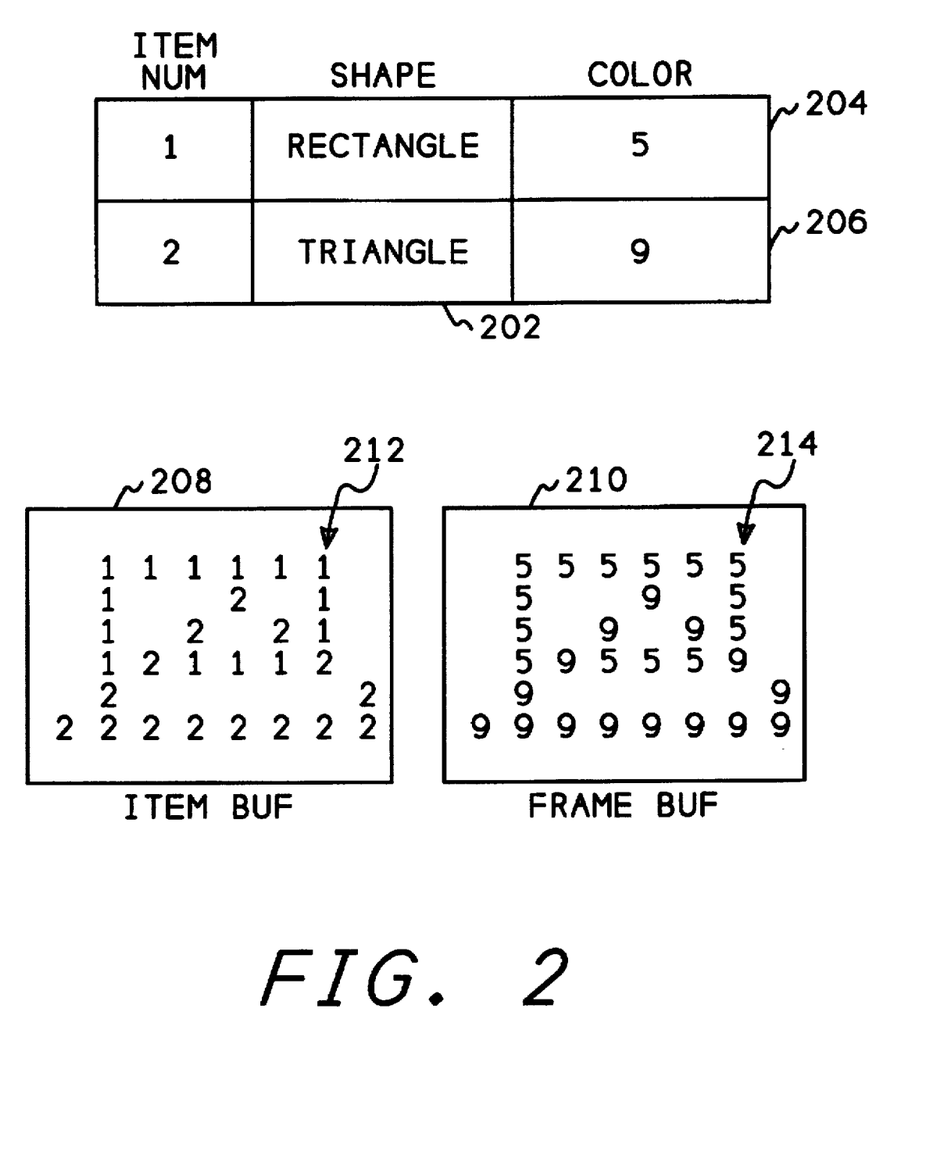
FIG. 2 shows an illustration of a graphic object within a buffer.

FIG. 2 shows an illustration of graphic objects displayed within a buffer. Referring now to FIG. 2, a computer graphics display list 202 contains two graphics objects 204 and 206. Graphics object 204 has been assigned an item identifier, which is a number 1, the Graphics Object has a rectangle shape, and it will be displayed using color number 5. Graphics object 206 has been assigned item number 2, the Object has a triangle shape, and it will be displayed using color number 9. Alternatively, the relative number of the graphics object, from the beginning of the list, could be used as the item number, thus avoiding storing the item number in the list.

Frame buffer 210 shows how these two graphic images would be rendered onto a display device, such as the graphics display 108 (FIG. 1). Since the triangle graphics object 206 is second in the list, it was rendered after the rectangle graphics object, therefore, the triangle overlays the rectangle at the points where they intersect. Item buffer 208 shows how item numbers for these two graphics objects are stored in the item buffer. At each pixel location of the rectangle graphics object, item number 1 is stored in the item buffer, and at each pixel location of the triangle graphics object 206, item number 2 is stored in the item buffer. Since the triangle is created last, item number 2 is stored at all intersecting points of the triangle and rectangle. If a user places the pointer device cursor over pixel location 214 and presses a selection button, the system references corresponding location 212 in item buffer 208 and retrieves item number 1, thus, immediately indicating that the user has picked the rectangle graphics object.

Figure 3:
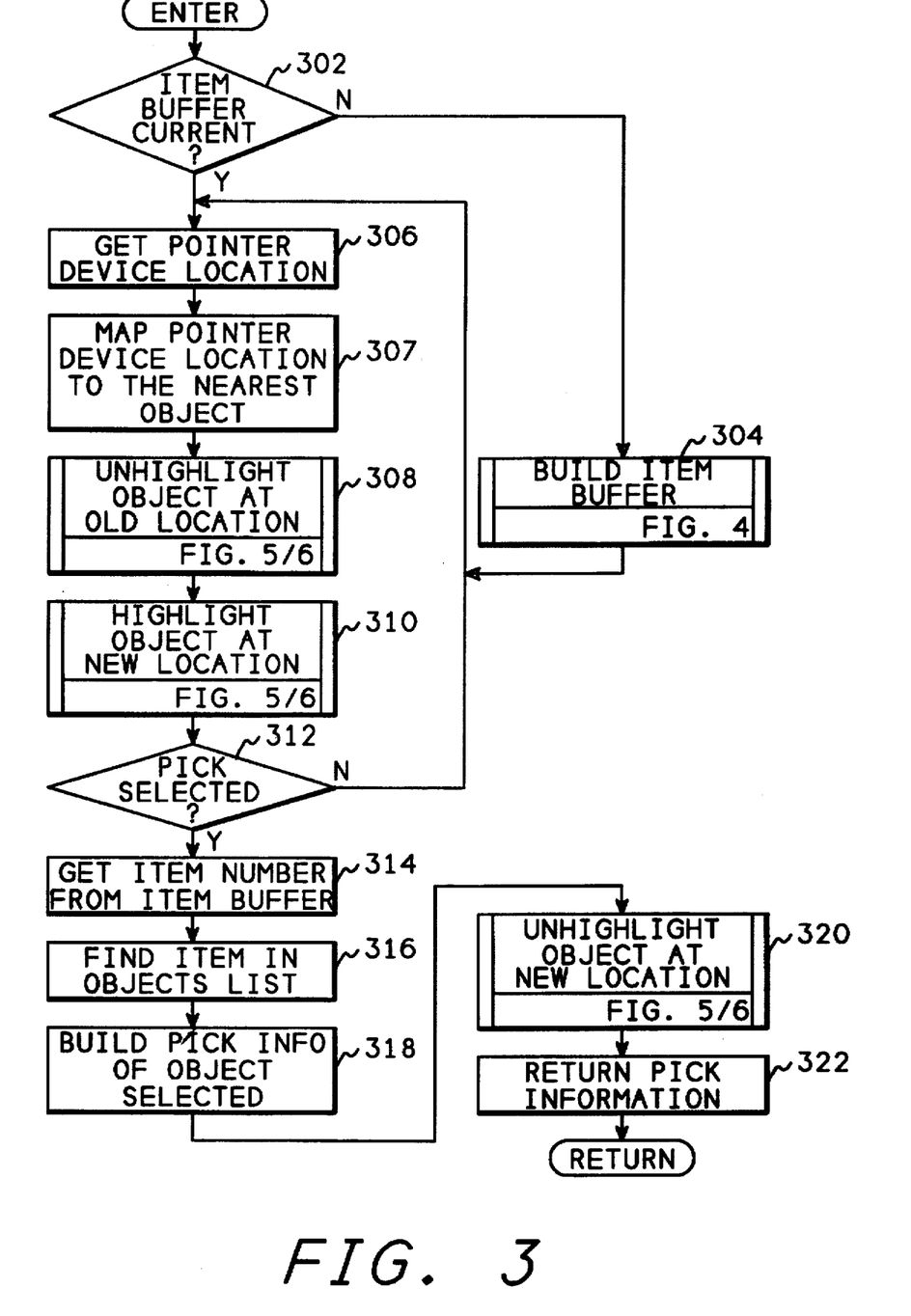
FIG. 3 shows a top level flowchart of the invention.

FIG. 3 shows a top level flowchart of the invention. The item buffer pick software 128 (FIG. 1) is part of a larger graphics software system 120 (FIG. 1). When the user of the larger graphics software system 120 performs a pick operation, the graphics software 120 calls the item buffer pick software of the present invention. Referring now to FIG. 3, when the item buffer pick software of the present invention is called, control enters at block 302. Block 302 determines whether the item buffer is current with respect to the graphics image being displayed. The item buffer will be current if the scene being displayed has not changed since the last time an item buffer was created. However, an item buffer is initially empty, and must be created before the first pick operation. The item buffer could be kept current by creating the item buffer at the time the graphics objects list is traversed to create the display data, or it can be created, as described below, when the pick operation is started.

Figure 4:
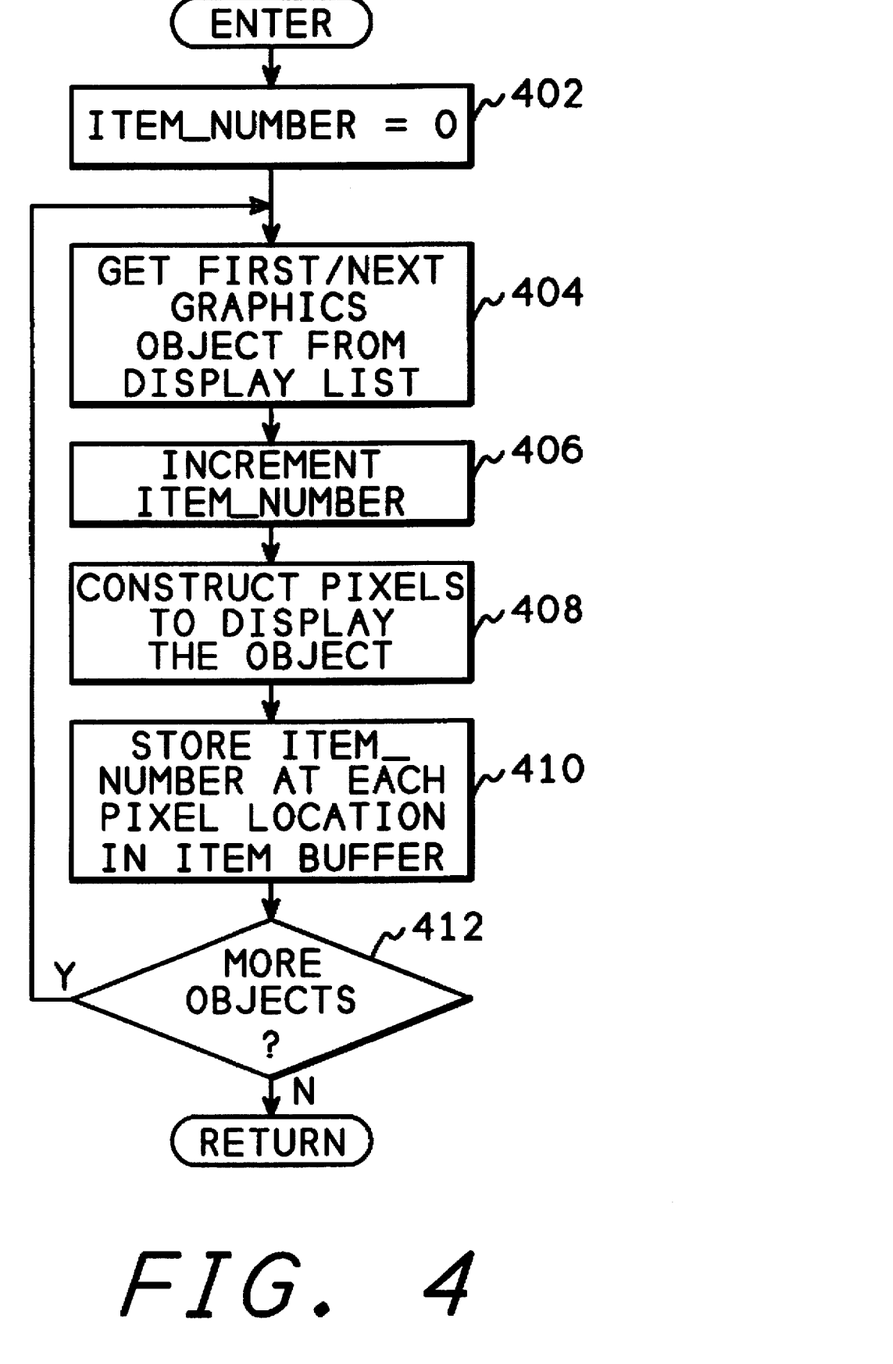
FIG. 4 shows a flowchart of the build item buffer process called from FIG. 3.

If the item buffer is not current, block 302 goes to block 304 which calls FIG. 4 to build a current item buffer. After returning from FIG. 4, or if the item buffer was already current, control goes to block 306 which gets the pointer device location set by the user. This location, typically indicated by a cursor on the display screen, is the location to which the user has moved the mouse or other pointer device. Thus, this is the location where a pick operation will occur if the user presses the selection button on the pointer device.

Figure 5:
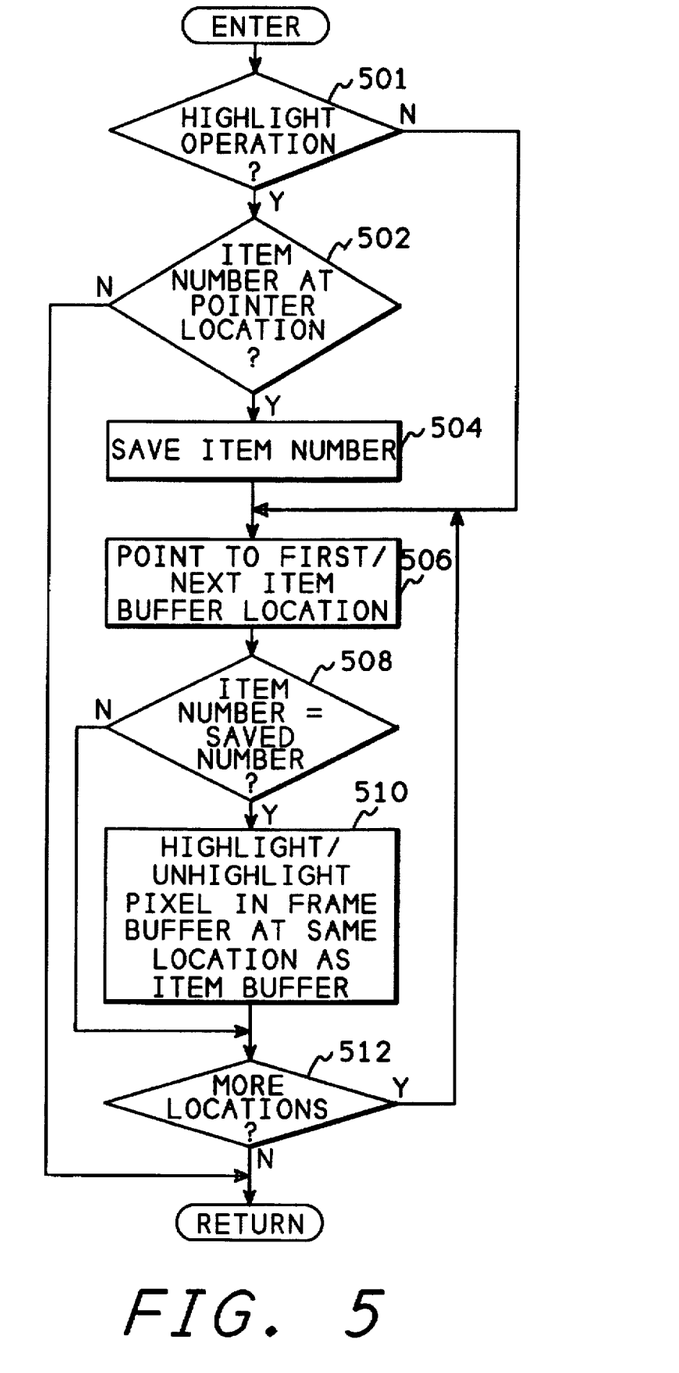
FIGS. 5 and 6 show flowcharts of alternative embodiments of the highlight graphics object process called from FIG. 3.
Figure 6:
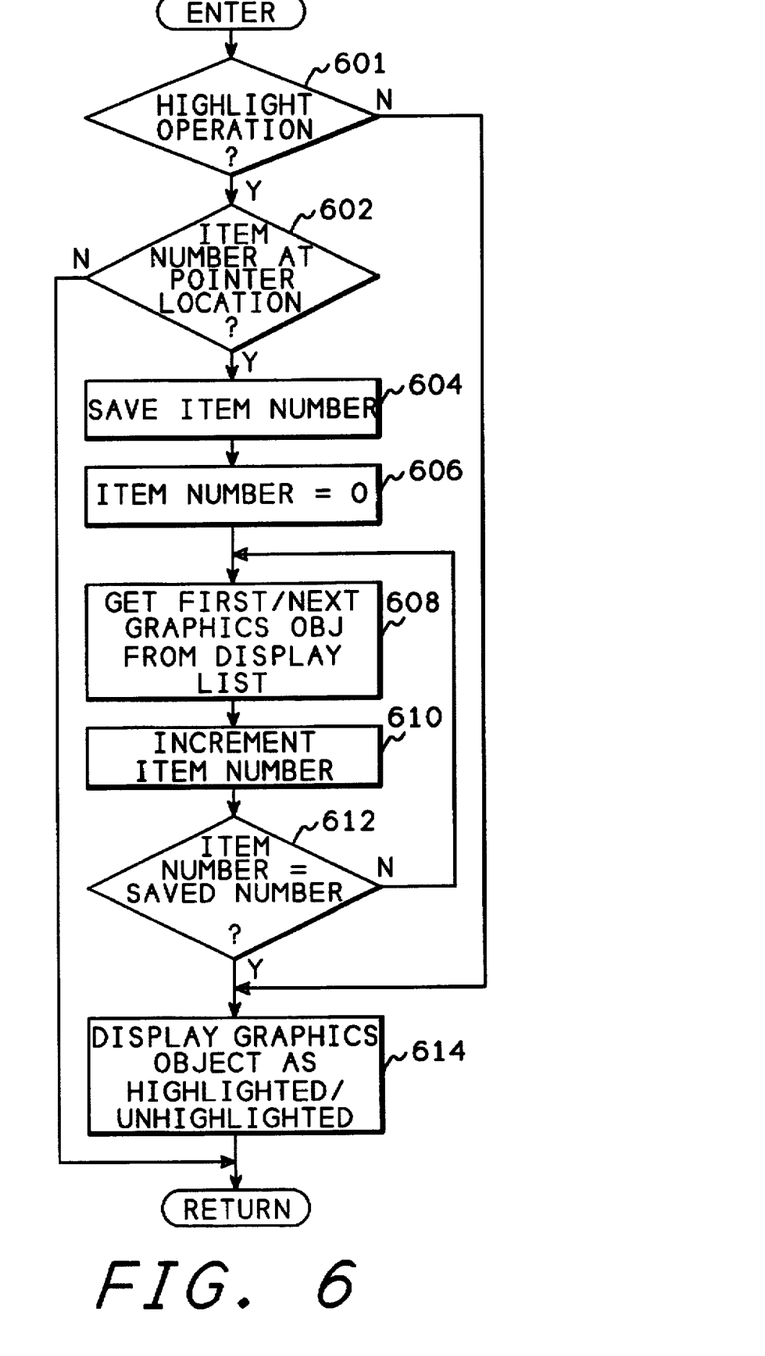

After retrieving the pointer device location, block 307 finds the nearest graphics object to the pointer location, and block 308 calls either FIG. 5 or FIG. 6 to unhighlight the graphics object, if any, that had been highlighted at the last location of the pointer device. That is, if the cursor has been moved from a previous object, that object will be highlighted, and must be unhighlighted to indicate that it is no longer under the cursor. As will be discussed below, both FIG. 5 and FIG. 6 show alternative embodiments of the highlight and unhighlight operations. Thus, either could be called from block 308.

After returning from FIG. 5 or 6 and unhighlighting the old graphics object, block 310 again calls FIG. 5 or 6 to highlight the graphics object at the current pointer device location. This highlighting provides visual feedback to the user of system indicating which graphics object would be selected if the pointer device selection button is pressed. After highlighting the graphics object, block 310 goes to block 312 which determines whether a pick has been selected, that is, whether the user has pressed the selection button on the pointer device. If a pick has not been selected, block 312 returns to block 306 to continue the loop and highlight each graphics object as the user moves the cursor by moving the pointer device.

In this manner, the present invention highlights each graphics object as the cursor passes over that object. This is called pre-pick highlighting. When a graphics object is picked, it is also highlighted, and may remain highlighted for a fixed period of time, or until another pick operation is performed. This is called post-pick highlighting.

When the user depresses the pointer device selection button, block 312 transfers to block 314 which references the item buffer at the pointer device location and retrieves the item number. The pointer device location could be represented by a rectangular region of pixels inclose proximity to the actual pointer device location. This region is called an aperture and allows a selection when the pointer device location is very close to a graphics object, although not necessarily directly over the object.

Using this item number, block 316 accesses the graphics object list, and extracts the graphics object that was selected. Block 318 then builds pick information to be returned to the graphics software 120 (FIG. 1) of the graphics object selected and then block 320 calls FIG. 5 or FIG. 6 to unhighlight the graphics object that was selected to end the pick operation. Block 322 then returns the pick information built by block 318 to the graphics software 120.

As discussed above, a time delay may be placed between blocks 318 and 320 to provide time for a visual feedback to the operator to ensure them that the item was picked. In another embodiment, block 320 could be eliminated, and the graphics object would remain highlighted until the cursor was moved, at which time it would be unhighlighted by block 308 as discussed above.

FIG. 4 shows a flowchart of the build item buffer process called by block 304 of FIG. 3. Referring now to FIG. 4, after entry, block 402 sets an ITEM_NUMBER variable to zero. Block 404 then gets the first or next graphics object from the graphics object list and block 406 increments ITEM_NUMBER. Block 408 constructs each pixel necessary to display the graphics object extracted by block 404 and block 410 stores ITEM_NUMBER, in the item buffer, at each of the pixel locations constructed by block 408. Block 412 then determines whether there are more graphics objects on the graphics object list, and if there are, returns to block 404 to render the next graphics object into the item buffer. After all graphics objects have been processed, FIG. 4 returns to FIG. 3.

FIGS. 5 and 6 show two methods of highlighting or unhighlighting a graphics object within the frame buffer. The intent of highlighting is to highlight those pixels in the frame buffer whose corresponding identifiers in the item buffer match the picked identifier. For Example, in FIG. 2, the triangle could be highlighted by searching the item buffer for all occurrences of item 2, and changing the color in the frame buffer to, for example, a complementary color at all locations corresponding to the item buffer locations that contained item number 2, thus the triangle would be highlighted by making it a different color. Unhighlighting occurs by performing the same operation, but changing the color in the frame buffer back to the original color 9.

Referring now to FIG. 5, after entry, block 501 determines whether the operation is a highlight or unhighlight operation. If it is an unhighlight operation, block 501 transfers to block 506 to search for the item number saved by the previous highlight operation.

If the operation is a highlight, block 501 goes to block 502 which determines whether there is an item number in the item buffer at the pointer location. If not, no highlighting need occur so block 502 returns to FIG. 3. If there is an item number in the item buffer at the pointer location, block 502 goes to block 504 which saves the item number and block 506 points to the first location in the item buffer. Block 508 then determines whether the number stored at this location is equal to the item number saved in block 504 and if not, block 508 returns to block 506 to move to the next location in the item buffer. If the item number at the location is equal to the saved item number, block 508 goes to block 510 which highlights or unhighlights the pixel in the frame buffer at the same location as the current item buffer location. Block 512 then determines whether there are additional locations in the item buffer and if so, returns to block 506 to point to the next location. After the entire item buffer has been processed, block 512 returns to FIG. 3. Using the method of FIG. 5, the only pixels highlighted will be for portions of the graphics object that are visible to the operator through the frame buffer. That is, if part of a graphics object has been overlaid by another graphics object, such as in the example of FIG. 2, the overlaid area will not be highlighted when the first graphics object is selected, but it will be highlighted if the second graphics object is selected.

FIG. 6 shows an alternative embodiment of highlighting a graphics object. Referring now to FIG. 6, block 601 determines whether the operation is a highlight or unhighlight. If the operation is an unhighlight, block 601 goes to block 614 and uses the graphics object saved during the last highlight operation.

If the operation is a highlight, block 601 goes to block 602 which determines whether the item buffer contains an item number at the pointer location and, if not, returns to FIG. 3 since there is no graphics object there to highlight. If there is an item number at the pointer location, block 604 saves the item number and block 606 sets a new item number to zero. Block 608 gets the first graphics object from the display list and block 610 increments the new item number. Block 612 then compares the new item number to the saved item number and if they are equal, control goes to block 614 which displays the graphics object as highlighted or unhighlighted. If the item number is unequal to the saved item number, block 612 returns to block 608 until the correct item number is located in the graphics object list. Thus, FIG. 6 traverses the graphics object list but does not display the graphics objects until the matching item number is found. Using this method the entire graphics object will be displayed, even if it was originally partially obscured by another graphics object.

One problem that can occur is too few bits per pixel in the memory used to realize the item buffer. The number of bits at each pixel location in the item buffer must be sufficient to store a number large enough to allow each graphics object to be identified by a unique item number. Thus, if there are less than 256 graphics objects in the list, eight bits is sufficient to store an item number. However, many graphic images contain more than 256 graphics objects, thus, more than eight bits is typically needed to store the item number.

When a display contains two frame buffers, one may be used as an item buffer when it is not being used to display an image. If the display is a color display with eight bits for each of the three primary colors, a total of 24 bits is available in the alternate buffer to store the item number and only a very rare image would exceed the number that can be stored in 24 bits, that is, 16 million. However, if the graphics display is a monochrome display, typically only eight bits are used to display each pixel as a gray scale level. Many color displays also have only 8 bits and, as discussed above, many graphic images exceed 256 graphics objects. Any one of three methods could be used to overcome this limitation. The first method is to store the item buffer in the main memory of the computer system, for example, using buffer 122 of FIG. 1. Typically, main memory has sufficient space to store any size item number desired.

Many graphics packages cannot render an image to a main memory buffer, however, and can only render an image to a frame buffer contained within the graphics device. If the frame buffer contains too few bits per pixel, the item number will have to be partially constructed in each of several passes, and the partially constructed buffers saved in main memory after each pass.

One method for this piecewise constructing of the item buffer is to render the image multiple times to the limited frame buffer using a different mask for the item identifier each time the image is rendered. After each pass of rendering the image, the item buffer is copied to a section of main memory. The composite of these sections then becomes a complete item buffer.

Figure 7:
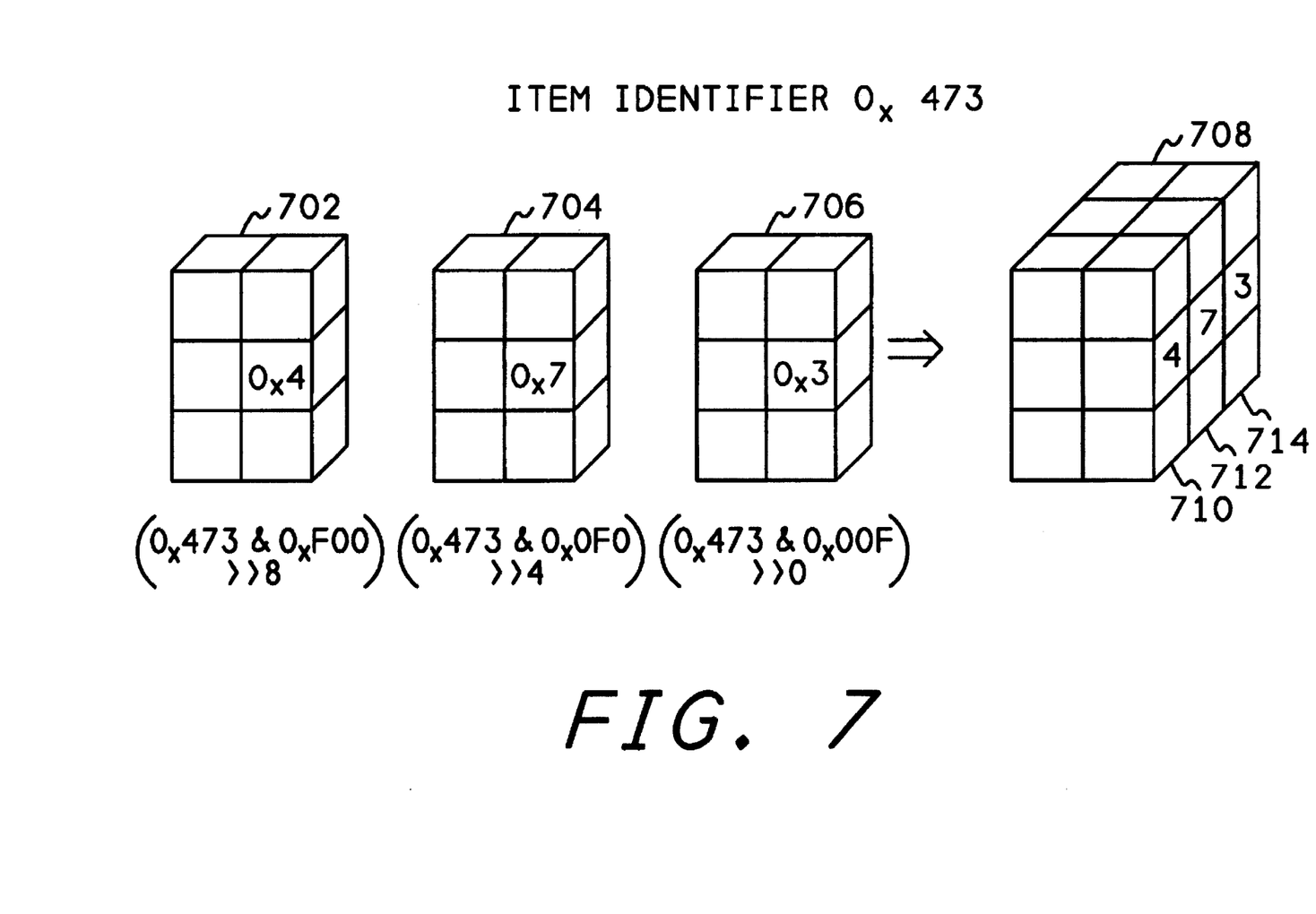
FIG. 7 shows a block diagram of building an item buffer using partial item identifiers.

FIG. 7 shows a block diagram of building an item buffer using partial item numbers. Specifically, FIG. 7 builds four bits of the item number with each rendering pass. Referring now to FIG. 7, an item identifier, 0x473, needs to be stored in the item buffer. On the first pass through the item buffer, the item identifier is masked by a bit pattern of 0xF00, and then right shifted two digits, and stored in the item buffer image 702 as 0x4. The item buffer is then copied to main memory 708 as the first section 710. The graphics objects are rendered a second time and the item identifier 0x473 is masked with a mask of 0x0F0, right shifted one digit, and stored in the item buffer image 704 as 0x7. This item buffer image 704 is then copied to main memory 708 as the second section 712. The graphics objects are rendered a third time, and the item identifier is masked with a mask of 0x00F, and stored in the item buffer image 706 as 0x3. This result is then copied to the memory 708 as the third section 714. The result of these three passes is the three sections 710, 712, and 714 all combined in main memory to store the item identifier 0x473.

Figure 8:
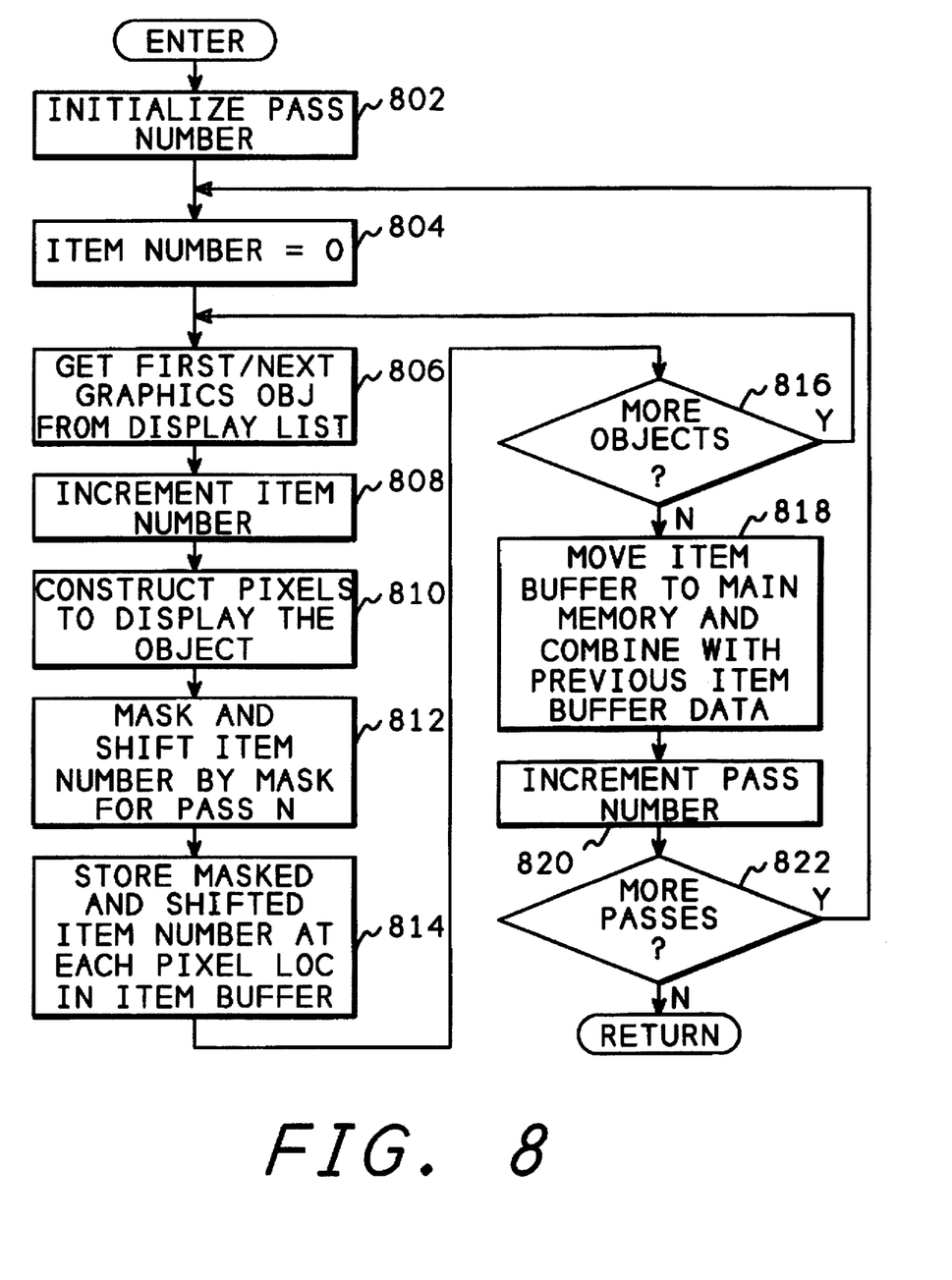
FIG. 8 shows a flowchart of the process of building an item buffer using partial item identifiers.

FIG. 8 shows a flowchart of the process of building an item buffer using the partial item numbers shown in FIG. 7. Referring now to FIG. 8, after entry, block 802 initializes the pass number and block 804 sets the item number to zero. Block 806 then gets the first graphics object from the display list, and block 808 increments the item number. Block 810 constructs the pixels to display the graphics object and block 812 masks and shifts the item number by the mask and shift value for this particular pass. Mask and shift values are designed to separate the item number into a number of bits small enough to fit into the number of bits available for the display, and shift these bits into the low order bits of the number for storing. Block 814 then stores the masked and shifted item number at each pixel location in the item buffer. Block 816 determines if there are more graphics objects and if so, returns to block 806 to process the next graphics object. After all graphics objects in the list have been processed, block 816 transfers to block 818 which moves the item buffer to main memory and block 820 increments the pass number. Block 822 determines whether there are more passes to be performed and if there are, returns to block 804 to perform the next pass. After all passes have been performed, and the item buffer has been copied to main memory once for each pass, FIG. 8 then returns to its caller.

Another method for creating an item buffer if the display screen contains only a single display buffer, is to remove the displayed picture, render the item identifiers into the display buffer, copy the display buffer to main memory, and then retraverse the graphics objects list to render the image onto the display buffer a second time.

Another method for constructing an item buffer, when the item buffer is not large enough to hold a complete item number, is to construct the item buffer and store only part of the item number at each pixel location. The resulting item numbers in the item buffer then form a one-to-many correspondence with the graphics objects of the scene. That is, since the item number stored in the item buffer is not complete, it may represent more than one graphics object. Using this method, the item number retrieved from a pick operation serves as assisting information, instead of definitive information, for resolving the pick operation. The assistance consists of isolating the remaining search of the display list to 1/n'th of the total graphics objects where n is the number of unique identifiers that can be stored in the item buffer.

The previous methods all concentrated on accommodating memory limitations by "finding" additional memory. The following methods address the memory limitation by reducing the quantity of item buffers that need to be stored. The number of item identifiers may be reduced by only creating item numbers for portions of the display list that can be picked. Another way to reduce the quantity of item numbers is to create item numbers only for the graphics objects that are currently being displayed on the screen, for example, after a "zoom in" operation for a large scene, only a part of the total graphics objects within the scene are visible, so only these visible graphics objects would need item numbers, since only these visible objects can be picked.

For some applications, the pick operation may be defined such that its granularity is coarser than a single pick operation, that is, a single pick operation may pick more than one graphics object. For this type of pick operation, fewer unique item numbers are needed since an item number is needed for only groups of graphics objects, not individual objects.

Figure 9:
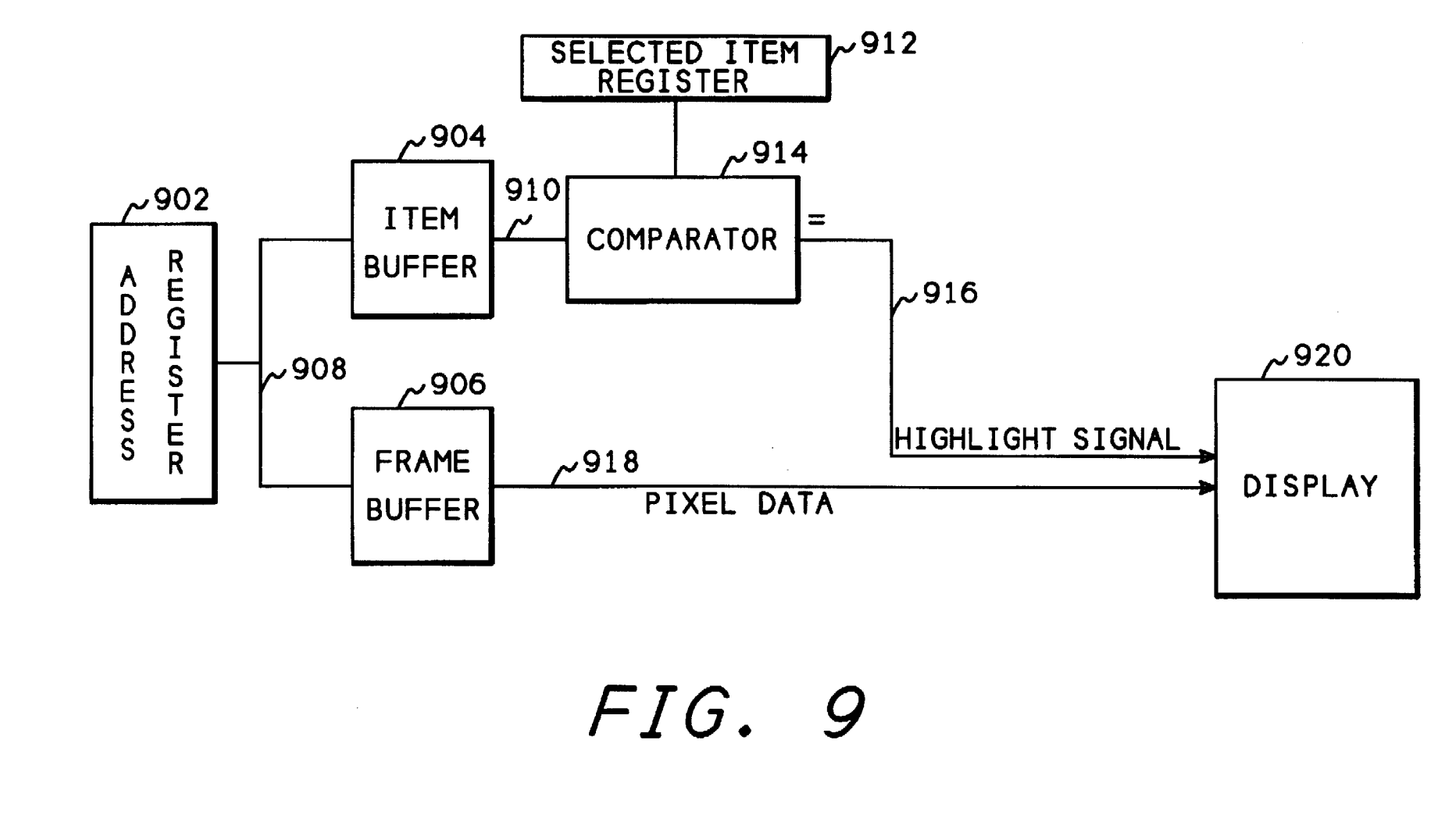
FIG. 9 shows a block diagram of the electronics for a hardware implementation of highlighting a graphics object.
Figure 10:
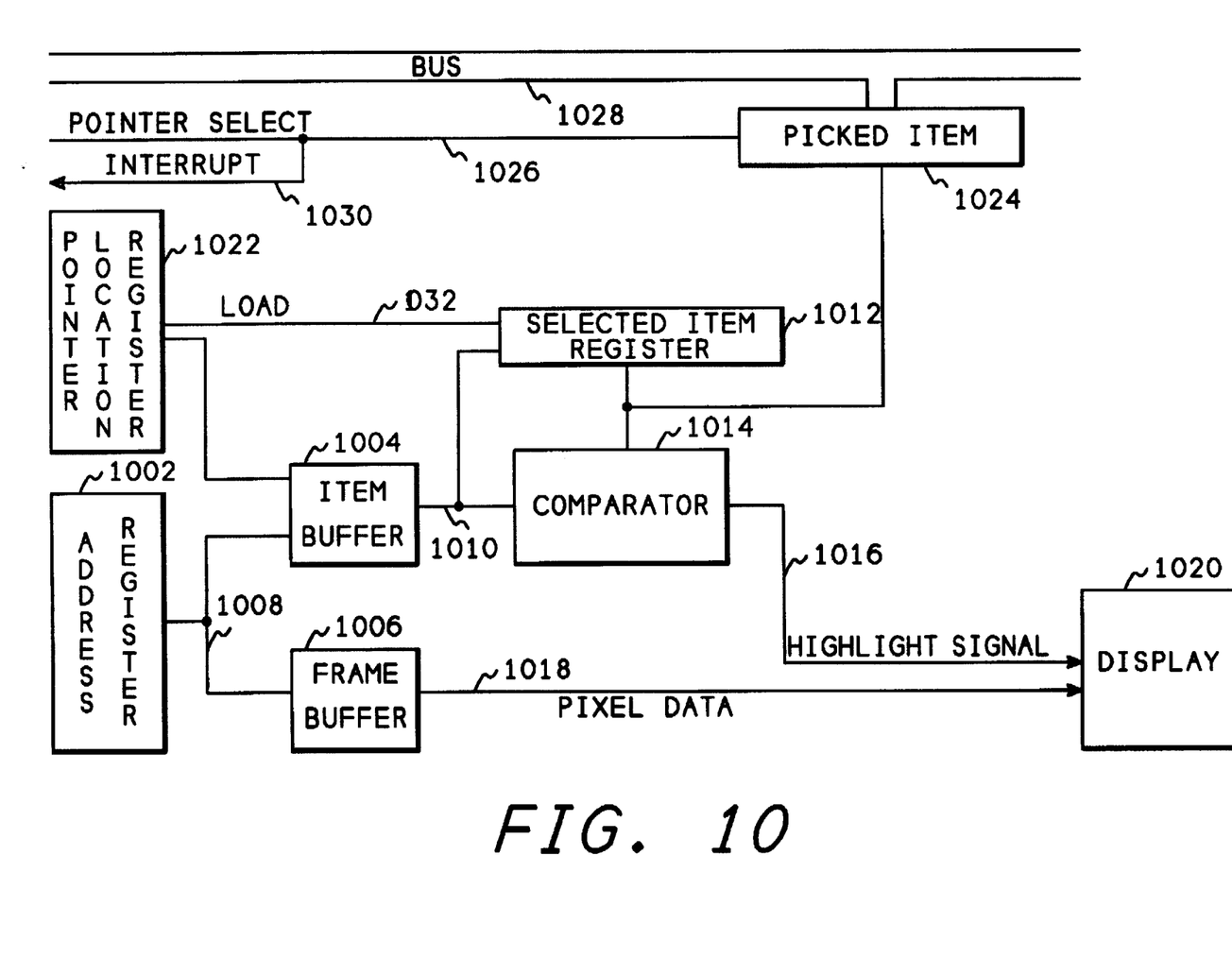
FIG. 10 shows a block diagram of a system wherein the entire cycle of highlighting and picking an item is moved into the hardware of the display device.

FIGS. 9 and 10 show block diagrams of hardware that can be used for item buffer picking. FIG. 9 shows a block diagram of hardware implemented within the display device 108 (FIG. 1) to automatically highlight a selected graphics object. FIG. 10 shows an extension of the concept of FIG. 9 wherein the entire cycle of highlighting and picking an item is moved into the hardware of the display device. With these methods, the contents of the frame buffer are not altered. Instead, special hardware is used to perform the highlighting.

Referring now to FIG. 9, a frame buffer 906 and an item buffer 904 are loaded in the same manner discussed above. After these are loaded, during each refresh cycle of the display device, an address register 902 supplies an address to both the frame buffer 906 and an item buffer 904. This register increments across the entire frame buffer every screen refresh cycle to address every pixel location on the screen. After data for a pixel is extracted from the frame buffer 906, the data is sent to the display over a bus 918. At the same time the pixel data is being extracted from the frame buffer 906, an item number is extracted from the item buffer 904 and sent to a comparator 914 over a bus 910. A selected item register 912 contains the item number of the item to be highlighted. Comparator 914 compares the contents of the selected item register 912 to the item number extracted from the item buffer 904 and if the compare is equal, a signal 916 will cause the display 920 to highlight the pixel data sent over the bus 918. The signal 916 may be a single bit, or it may be a different color to display, or any other information that indicates that a highlight should occur. In this manner, the item number entered into the selected item register 912 will cause the item to be highlighted when extracted from the frame buffer 906.

FIG. 10 shows an extension of the concept of FIG. 9 wherein the entire cycle of highlighting and picking an item is moved into the hardware of the display device. Referring now to FIG. 10, a frame buffer 1006 and an item buffer 1004 are loaded in the same manner discussed above. After these are loaded, during each refresh cycle of the display device, an address register 1002 supplies an address to both the frame buffer 1006 and an item buffer 1004. This register increments across the entire frame buffer every screen refresh cycle to address every pixel location on the screen. After data for a pixel is extracted from the frame buffer 1006, the data is sent to the display over a bus 1018.

A pointer location register 1022 contains the screen location currently being pointed to by the pointer device. This register changes each time the pointer device is moved. Each time the register 1022 changes, the contents of the pointer location register are used to access the item buffer 1004 and retrieve an item number. This item number is loaded into the selected item register 1012 by the load signal 1032, thus the selected item register 1012 always contains the item number of the graphics object at the pointer device location on the screen.

At the same time the pixel data is being extracted from the frame buffer 1006, an item number is extracted from the item buffer 1004 and sent to a comparator 1014 over a bus 1010. Comparator 1014 compares the contents of the selected item register 1012 to the item number extracted from the item buffer 1004 and if the compare is equal, a signal 1016 will cause the display 1020 to highlight the pixel data sent over the bus 1018. The signal 1016 may be a single bit, or it may be a different color to display, or any other information that indicates that a highlight should occur. In this manner, the graphics object at the pointer device location will be highlighted during each refresh cycle.

When the select button on the pointer device is pressed, a pointer select signal 1026 copies the contents of the selected item register into a picked item register 1024, and also sends an interrupt signal 1030 to allow software located in a processor connected to the display device to read the contents of the picked item register over the bus 1028. Thus in the circuit of FIG. 10, the entire operation of highlighting and picking an item can be performed within the hardware of the display device.

The item buffer 1004 and the frame buffer 1006 could be combined into a single buffer, with the item buffer being one section of the buffer, and the frame buffer being a second section. With this arrangement, the data for the frame buffer, and the item number are both created and stored when the list of graphics objects being displayed is traversed to render the display.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for selecting one of a plurality of graphic objects displayed on a graphics display screen within a computer system, said system comprising:

an item buffer memory having a storage location corresponding to each display location on the graphics display screen and further wherein each said storage location contains a unique item identifier for the graphic object displayed at said corresponding location on said graphics display screen;

selected item register means for storing an item identifier of an item selected for highlighting, wherein said item identifier is placed in said selected item register by a computer system attached to said graphics display screen;

means for retrieving an item identifier from a location in said item buffer corresponding to each said location of said graphics display device, wherein said item identifiers are retrieved in synchronization with data being displayed on said graphics display screen;

means for comparing each said retrieved item identifier to contents of said selected item register; and means for highlighting said data being displayed on said graphics display screen when said retrieved item identifier equals the contents of said selected item register.

2. A system for highlighting and selecting one of a plurality of graphic objects displayed on a graphics display screen within a computer system, said system comprising:

an item buffer memory having a storage location corresponding to each display location on the graphics display screen and further wherein each said storage location contains a unique item identifier for the graphic object displayed at said corresponding location on said graphics display screen;

a pointer device for providing a location on the graphics display screen in accordance with movement of said pointer device;

means for retrieving a pointer item identifier from a location in said item buffer corresponding to a current location of said pointer device;

means for retrieving a display item identifier from each location of said item buffer memory corresponding to each display location of said graphics display screen, wherein each said display item identifier is retrieved in synchronization with data for each location being displayed on said graphics display screen;

means for comparing each said display item identifier to said pointer item identifier;

means for highlighting said data from each display location on said graphics display screen when said retrieved display item identifier equals said pointer item identifier.

3. The system of claim 2 further comprising:

pointer select means for indicating that a selection operation has been performed with said pointer device; and means for storing said pointer item identifier when said pointer select means indicates said selection operation.

4. The system of claim 2 wherein said item buffer memory is a section of a frame buffer memory, located in said graphics display screen and containing said data, and further wherein said item buffer memory and said frame buffer memory are loaded simultaneously.

* * * * *